No. 657,698. Patented Sept. 11, 1900.
J. A. H. HASBROUCK.
PROCESS OF AGING ALCOHOLIC LIQUORS.
(Application filed Aug. 5, 1899.)
(No Model.)
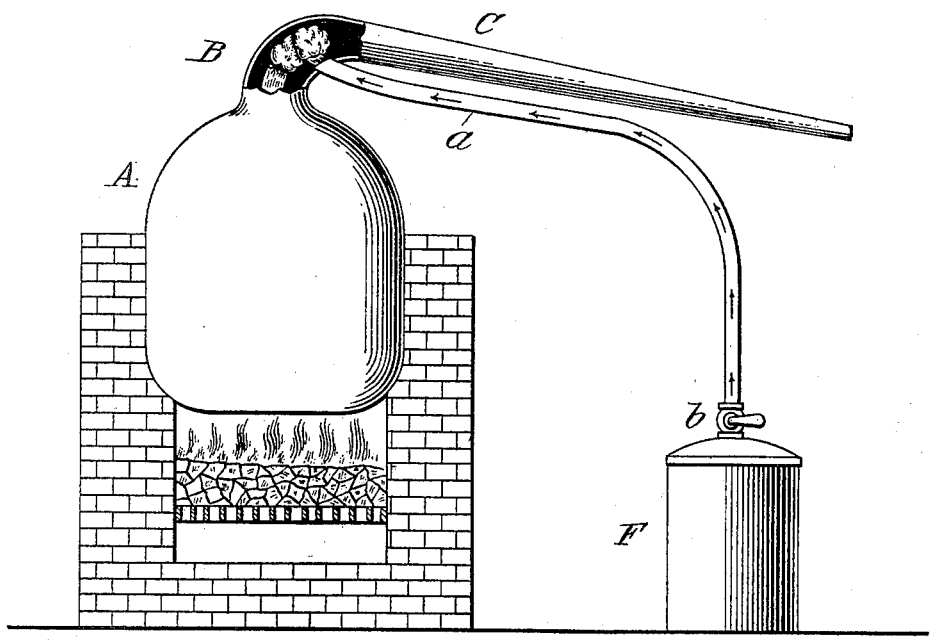
Witnesses:
C. L. Belcher
Chas E Peters
Inventor
Julian A. H. Hasbrouck
By Witter & Donn
Attorney

UNITED STATES PATENT OFFICE.

JULIAN A. H. HASBROUCK, OF NEW YORK, N. Y.

PROCESS OF AGING ALCOHOLIC LIQUORS.

SPECIFICATION forming part of Letters Patent No. 657,698, dated September 11, 1900.

Application filed August 5, 1899. Serial No. 726,254. (No specimens.)

*To all whom it may concern:*

Be it known that I, JULIAN A. H. HASBROUCK, a citizen of the United States, residing at New York, borough of Brooklyn, in the county of Kings and State of New York, have invented certain new and useful Improvements in Processes of Aging Alcoholic Liquors; and I do hereby declare the following to be a full, clear, and exact description of the invention, such as will enable others skilled in the art to which it appertains to make and use the same.

My invention has reference to the treatment of spirituous or alcoholic liquors—such as brandy, whisky, rum, &c.—for the purpose of improving their quality by artificially producing the ripening or mellowing effects known as "aging," which are produced naturally by keeping the liquor under certain conditions of temperature in store for a considerable length of time after its distillation.

As is well known, spirituous liquors when newly distilled are not fit for consumption, owing largely to the presence of fusel-oil, (and possibly of other noxious ingredients,) the nature of which is changed in time and converted into innocuous substances, which change is necessary to give the liquor the distinctive qualities that make it healthful and palatable. In order to effect these changes, the newly-distilled liquor is stored until it reaches maturity, which it does naturally by the action of air and heat, whereby the fusel-oil becomes reduced or changed in character, according to the time the liquor is allowed to remain in storage and exposed to the action of the said elements. The maturing process is known as "aging," and the time usually desired for reaching the required result by the natural process is not less than three years. The natural process being very expensive, owing to the cost of storage, loss by evaporation, and the interest on capital, the price of pure old liquor is so high that adulteration is resorted to to bring the price down within reach of the bulk of the consumers. In a patent granted to me January 7, 1890, No. 418,792, for process of aging liquors a method was described and claimed that was founded upon the theory that the aging of liquor was the result of the action of oxygen upon the deleterious ingredients of the liquor and that by bringing every atom of the liquor into chemical contact with oxygen gas by artificial means the liquor would be aged in much less time than by the natural method. In that process the liquor was heated, agitated, and broken up into spray or very fine particles by mechanical means in a tank specially constructed for the purpose and oxygen gas admitted to the tank from time to time, so that the finely-divided particles of the liquor should be exposed to the action of the gas that filled the space above the body of liquor and formed an atmosphere in which the particles of liquor were cast and thrown about, and thus exposed to the action of the gas for a greater or less length of time, by means of which the aging of the liquor was effected if the process was continued a sufficient length of time. This process proved to be entirely efficient as a means of aging liquors, and new whisky (not more than six weeks distilled) after being treated from sixty to ninety days was made equal in quality to three-year-old whisky which had undergone the natural process. Owing to the fact that in that process the whisky had to be taken out of the original barrel and placed in a tank to be treated, this involving the canceling of the "warehouse" and "tax-paid" stamps (which are the guarantee of the purity of the liquor) and the substitution of either "wholesale dealer" or "rectifiers" stamps, the process could not be used and was therefore commercially impracticable.

The accompanying drawing illustrates an apparatus suitable for the practical application of my process.

The apparatus consists of a still A, which is constructed in the usual manner and from which a pipe C extends and conducts the vapors to the condenser. (Not shown.) The still described and illustrated is of the simplest form and serves the purpose of practically illustrating a mode of applying my improved process; but it is to be understood that I do not limit the use of the process to any special form of distilling apparatus, as it is my intention to apply it to any apparatus used for distillation from the mash or for redistillation of the distillate or for rectification. At some point between the still and the condenser an opening is made in the pipe C and a twyer-pipe $a$ with a cock $b$ inserted therein. This opening and pipe are preferably set at a more or less obtuse angle to the longitudinal line of the pipe C and opposite to the direction of the movement of the vapors through the said pipe from the still to the condenser. By turning the exit of the pipe $a$ where it enters the pipe C in the opposite direction to the outflow of the vapors from the still to the condenser the oxygen gas is injected into the vapors contrary to their movement, which by the concussive impact of the particles of the two materials will bring about a more thorough intermingling of the gas with the vapors and a sure and more thorough exposure of every particle of the vapors to contact with the oxygen, owing to the slight check given to the vapors by the imposing current of gas flowing in the opposite direction, whereby a commotion or whirling of the materials is produced while they are in contact, thus giving an opportunity for a chemical combination to take place between the oxidizable elements of the vapors and the gas. Furthermore, by this mode of introducing the gas the liability of waste is averted, whereas when it is discharged into the vapors in the direction of their movement a large part is driven into the condenser and goes to waste. The pipe $a$ conveys oxygen gas or its equivalent from a tank F, with which it is connected by a pipe $d$, to the interior of the pipe C and into the stream of vapor passing through the said pipe to the condenser directly or through intermediate vessels used in connection with the more complicated forms of distilling apparatus, the purpose being to insure a quick and thorough intermingling of the gas with the vapors, the place where the gas is carried into the pipe C, whether directly into the still or at a greater or less distance from the still or between the still and the intermediate vessels (wortwarmer) and its worm, and the rectificator, or between the intermediate vessels and the condenser.

While I have mentioned oxygen gas as the agent used in my process, I do not confine myself thereto, as other oxidizing agents may be substituted for pure oxygen gas—as, for example, atmospheric air.

I claim—

1. In aging liquors the process herein described consisting in injecting an oxygenizing agent into the vaporous distillate in the opposite direction to the motion of the distillate directly as it comes from the still, producing a concussive impact of the particles of the vapor and oxygenizing agent as and for the purpose specified.

2. In aging liquors the process herein described consisting in injecting oxygen gas into the vaporous distillate in the opposite direction to the motion of the distillate directly as it comes from the still producing thereby a concussive impact of the particles of the vapor and the oxygen gas, as and for the purpose specified.

In testimony that I claim the invention above set forth I do affix my signature in presence of two witnesses.

JULIAN A. H. HASBROUCK.

Witnesses:
 WILTON C. DONN,
 CHAS. E. PETERS.